US010990158B2

(12) United States Patent
Reynolds (10) Patent No.: US 10,990,158 B2
(45) Date of Patent: Apr. 27, 2021

(54) MITIGATING INTERFERENCE IN A CAPACITIVE SENSING DEVICE

(71) Applicant: SYNAPTICS INCORPORATED, San Jose, CA (US)

(72) Inventor: Joseph Kurth Reynolds, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 691 days.

(21) Appl. No.: 15/676,931

(22) Filed: Aug. 14, 2017

(65) Prior Publication Data

US 2019/0050075 A1 Feb. 14, 2019

(51) Int. Cl.
| G06F 3/044 | (2006.01) |
| G06F 3/041 | (2006.01) |
| G06F 1/3234 | (2019.01) |
| G06F 3/0488 | (2013.01) |
| G06F 3/0354 | (2013.01) |

(52) U.S. Cl.
CPC ........ *G06F 1/3262* (2013.01); *G06F 3/03547* (2013.01); *G06F 3/0446* (2019.05); *G06F 3/0488* (2013.01); *G06F 3/04166* (2019.05)

(58) Field of Classification Search
CPC ....... G06F 3/044; G06F 3/0418; G06F 3/0488
See application file for complete search history.

(56) References Cited

U.S. PATENT DOCUMENTS

| 5,565,658 | A | * | 10/1996 | Gerpheide | G06F 3/041 |
| | | | | | 178/18.02 |
| 5,945,980 | A | * | 8/1999 | Moissev | G06F 3/0446 |
| | | | | | 345/173 |
| 2011/0057899 | A1 | * | 3/2011 | Sleeman | G06F 3/0445 |
| | | | | | 345/174 |
| 2011/0063227 | A1 | * | 3/2011 | Wu | G06F 3/0446 |
| | | | | | 345/173 |
| 2015/0331509 | A1 | * | 11/2015 | Huang | G06F 3/0416 |
| | | | | | 345/173 |
| 2017/0242524 | A1 | * | 8/2017 | Kim | G06F 3/0412 |
| 2017/0308237 | A1 | * | 10/2017 | Sun | G06F 3/0412 |
| 2018/0224991 | A1 | * | 8/2018 | Gu | G06F 3/0447 |

* cited by examiner

Primary Examiner — Benyam Ketema
(74) Attorney, Agent, or Firm — Paradice & Li LLP (57) ABSTRACT

An example method of capacitive sensing includes: transmitting a first waveform over a first time period; transmitting a second waveform over a second time period, wherein the second waveform is independent of the first waveform, and wherein at least a portion of the second time period does not overlap the first time period; receiving, from sensor electrodes, a first resulting signal in response to capacitive coupling of the first waveform and a second resulting signal in response to capacitive coupling of the second waveform; and processing the second resulting signal over at least a portion of the first time period, and the second time period, to obtain independent capacitive measurements.

20 Claims, 9 Drawing Sheets

MITIGATING INTERFERENCE IN A CAPACITIVE SENSING DEVICE

BACKGROUND

Field of the Disclosure

Embodiments of disclosure generally relate to capacitive sensors and, more particularly, mitigating interference of multiplexed electrodes in a capacitive sensing device.

Description of the Related Art

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. The proximity sensor devices can employ various techniques for sensing input object(s), including various capacitive sensing techniques, such as absolute capacitive techniques and transcapacitive techniques. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In an embodiment, a method of capacitive sensing includes: transmitting a first waveform over a first time period; transmitting a second waveform over a second time period, wherein the second waveform is independent of the first waveform, and wherein at least a portion of the second time period does not overlap the first time period; receiving, from sensor electrodes, a first resulting signal in response to capacitive coupling of the first waveform and a second resulting signal in response to capacitive coupling of the second waveform; and processing the second resulting signal over at least a portion of the first time period, and the second time period, to obtain independent capacitive measurements.

In another embodiment, an input device includes a plurality of sensor electrodes and a processing system coupled to the plurality of sensor electrodes. The processing system includes: at least one transmitter configured to transmit a first waveform over a first time period and a second waveform over a second time periods, wherein the second waveform is independent of the first waveform, and wherein at least a portion of the second time period does not overlap the first time period; a first receiver configured to receive a first resulting signal from a first sensor electrode of the plurality of sensor electrodes in response to capacitive coupling of the first waveform to the first sensor electrode; a second receiver configured to receive a second resulting signal from a second sensor electrode of the plurality of sensor electrodes in response to a capacitive coupling of the second waveform to the second sensor electrode; and a demodulator configured to process the second resulting signal over at least a portion of the first time period, and the second time period, to obtain independent capacitive measurements.

In another embodiment, a processing system for a capacitive sensing device includes: at least one transmitter configured to transmit a first waveform over a first time period and a second waveform over a second time period, wherein the second waveform is independent of the first waveform, and wherein at least a portion of the second time period does not overlap the first time period; a first receiver configured to receive a first resulting signal from a first sensor electrode in response to capacitive coupling of the first waveform to the first sensor electrode; a second receiver configured to receive a second resulting signal from a second sensor electrode in response to a capacitive coupling of the second waveform to the second sensor electrode; and a demodulator configured to process the second resulting signal over at least a portion of the first time period, and the second time period, to obtain independent capacitive measurements.

BRIEF DESCRIPTION OF THE DRAWINGS

The present embodiments are illustrated by way of example and are not intended to be limited by the figures of the accompanying drawings.

To facilitate understanding, identical reference numerals have been used, where possible, to designate identical elements that are common to the figures. It is contemplated that elements disclosed in one embodiment may be beneficially utilized in other embodiments without specific recitation. The drawings referred to here should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

Figure 1:
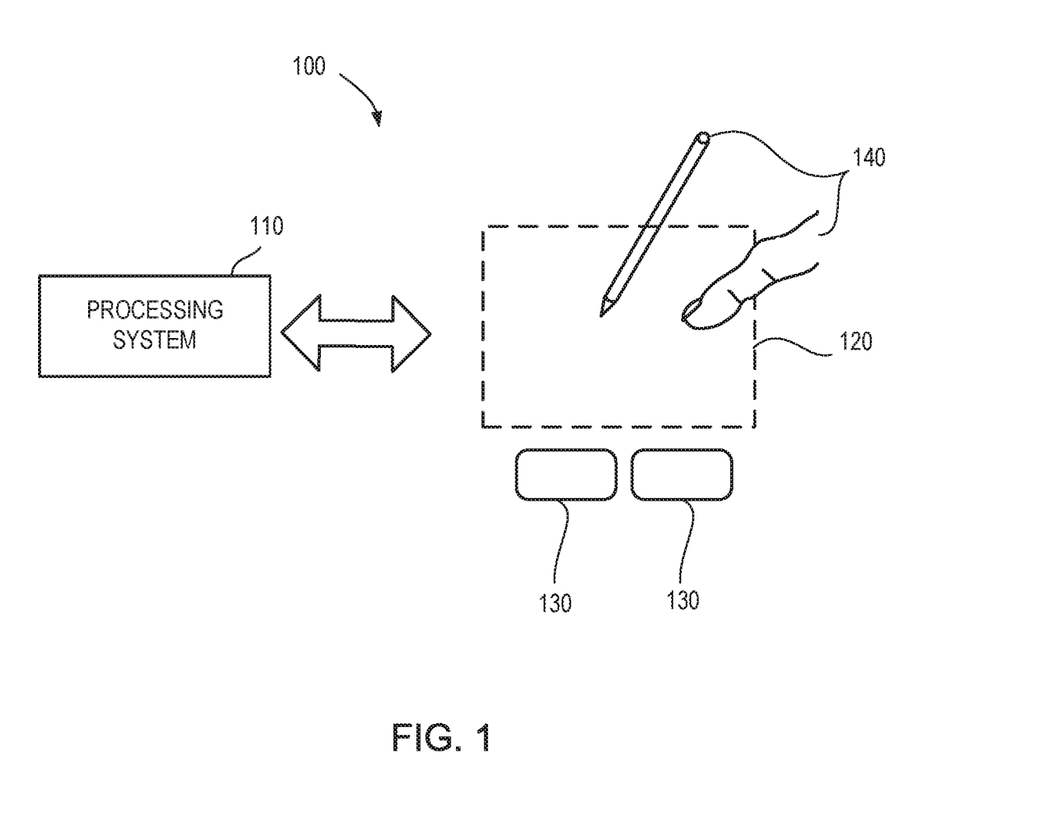
FIG. 1 is a block diagram of an exemplary input device, according to one embodiment described herein.

FIG. 1 is a block diagram of an exemplary input device 100 within which the present embodiments may be implemented. The input device 100 includes a processing system 110 and a sensing region 120. The input device 100 may be configured to provide input to an electronic system (not shown for simplicity). Examples of "electronic systems" (or "electronic devices") may include personal computers (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). The electronic system could be a host or a slave to the input device 100.

In the example of FIG. 1, the input device 100 may correspond to a proximity sensor device (e.g., a "touchpad" or a "touch sensor device") configured to sense input provided by one or more input objects 140 in a sensing region 120. Example input objects 140 include fingers and styli.

Sensing region 120 encompasses any space above, around, in, and/or proximate to the input device 100 in which the input device 100 is able to detect user input (e.g., provided by one or more input objects 140). The size, shape and location of particular sensing regions may vary depending on the actual implementation. In some embodiments, the sensing region 120 may detect inputs involving no physical contact with any surfaces of the input device 100 such as hovering, contact with an input surface of the input device 100, contact with an input surface of the input device 100 coupled with some amount of applied force or pressure, and/or a combination thereof.

The input device 100 may utilize various combinations of sensor components and sensing technologies to detect user input in the sensing region 120. Example sensing technologies may include capacitive, elastive, resistive, inductive, magnetic, acoustic, ultrasonic, radio frequency (RF) waves, and/or optical sensing technologies. The input device 100 may comprise one or more sensing elements configured to implement the various sensing technologies.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be electrically modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference or other electromagnetic signals coupled to the receiver electrode. Sensor electrodes may be dedicated to transmitters or receivers to facilitate transcapacitive sensing, or may be configured to both transmit and receive to facilitate absolute capacitance sensing.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals multiplexed onto transmitter sensor electrodes, and/or receiver circuitry configured to receive signals with receiver sensor electrodes. Alternately, a processing system for a self-capacitance sensor device may comprise multiple sensor electrodes multiplexed onto a smaller number of receiver analog front-end (AFE) circuits. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, such as firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (i.e., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline signal coupling. The baseline may be filtered to exclude user input, but track thermal or mechanical drift over time. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no additional input components and predominantly rely on the sensor electrodes for detection of the input object.

In some embodiments, the input device 100 comprises a touch screen interface, and the sensing region 120 overlaps at least part of an active area of a display screen. For example, the input device 100 may comprise substantially transparent sensor electrodes (e.g., indium tin oxide (ITO) conductors, metal mesh, etc.) overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing, such as for example a Vcom electrode in an LCD. As another example, the display screen may be operated in part or in total by the processing system 110.

It should be understood that while many embodiments are described in the context of a fully functioning apparatus, the mechanisms of the described embodiments are capable of being distributed as a program product (e.g., software) in a variety of forms. For example, the mechanisms may be implemented and distributed as a software program on information bearing media that is readable by electronic processors (e.g., non-transitory computer-readable and/or recordable/writable information bearing media readable by the processing system 110). Additionally, embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Although not shown in FIG. 1, the processing system 110, the input device 100, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities.

Figure 2A:
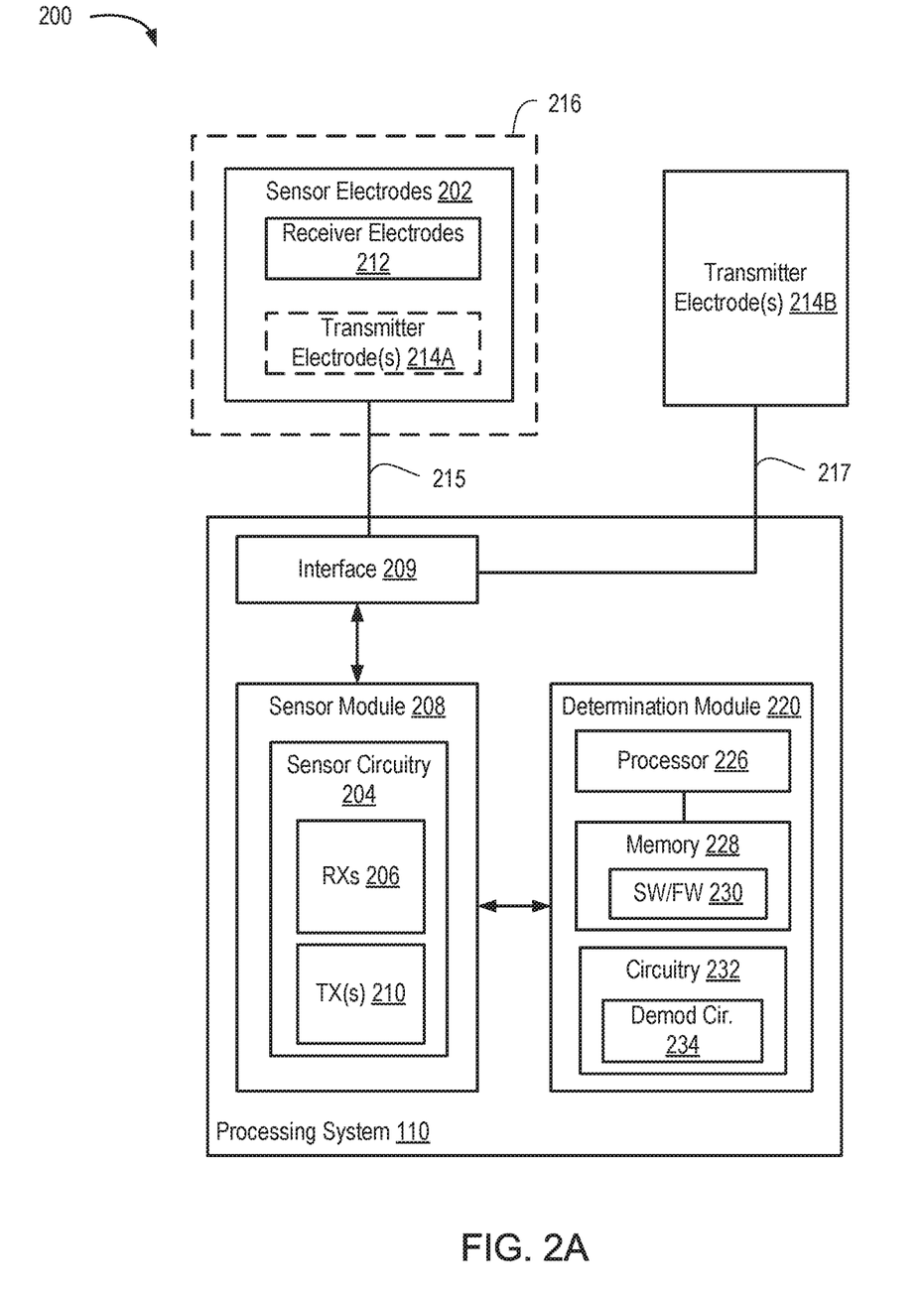
FIG. 2A is a block diagram depicting a capacitive sensing device of the input device of FIG. 1, according to some embodiments.
Figure 2B:
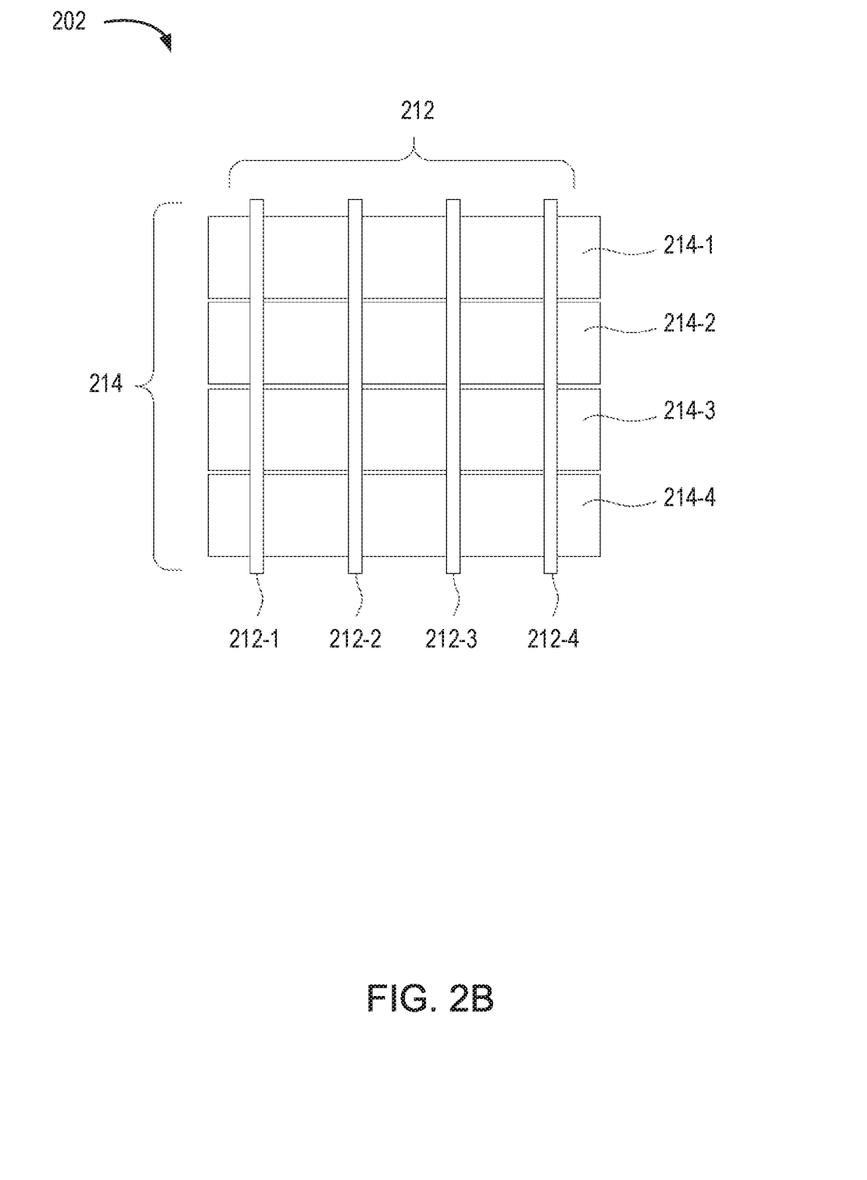
FIGS. 2B and 2C illustrate portions of exemplary sensor electrode implementations for capacitive sensing devices, according to embodiments described herein.
Figure 2C:
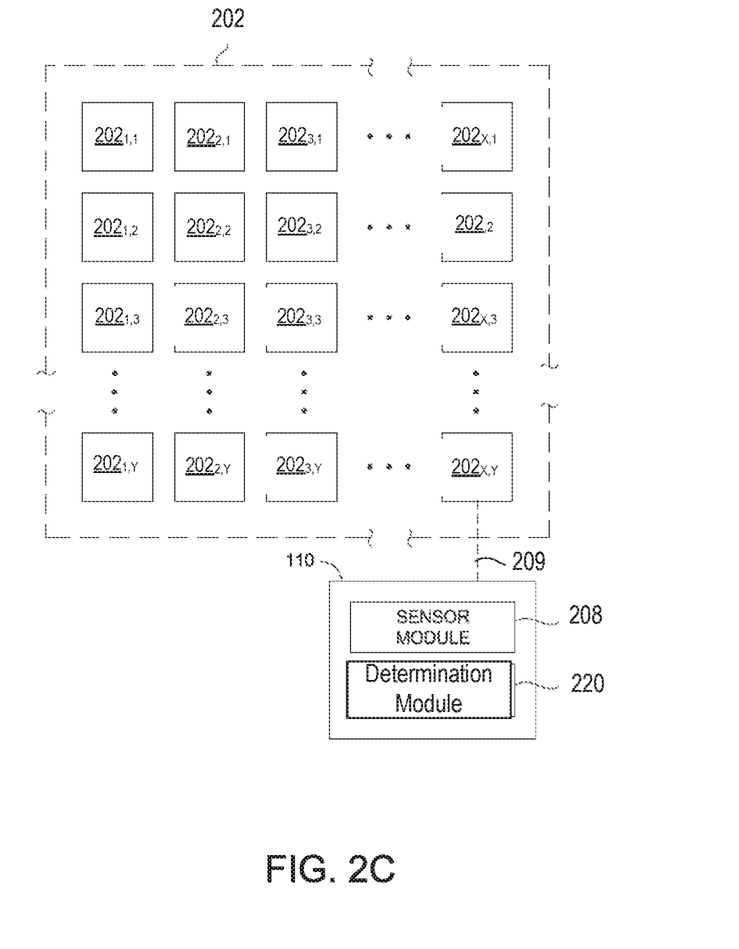

FIG. 2A is a block diagram depicting a capacitive sensing device 200 of the input device 100 according to some embodiments. The capacitive sensing device 200 includes a plurality of sensor electrodes 202. The sensor electrodes 202 are disposed in the sensing region 120 of the input device 100 and can be arranged in various patterns, such as a "bars and stripes" crossing pattern such as shown in FIG. 2B, a structurally similar area-filling diamond pattern, a fully connected matrix pattern such as shown in FIG. 2C, or other suitable pattern. During transcapacitive sensing, the sensor electrodes 202 include a plurality of receiver electrodes 212. In some embodiments, the sensor electrodes 202 include one or more transmitter electrodes 214A. In other embodiments, the capacitive sensing device 200 can include one or more transmitter electrodes 214B separate from the sensor electrodes 202. The sensor electrodes 202 are coupled to the processing system 110 through routing traces 215. If present, the transmitter electrode(s) 214B is/are coupled to the processing system 110 by electrical connection(s) 217. The transmitter electrode(s) 214A and the transmitter electrode(s) 214B are generally referred to as transmitter electrode(s) 214. The transmitter electrodes(s) 214 may perform functions other than transmitting, such as, guarding, over/under-guarding (i.e., in phase, but at a larger/smaller amplitude than a guard signal), or anti-guarding (i.e., 180 degrees out of phase from a guard signal). During absolute capacitive sensing, the capacitive sensing device 200 may use all or a portion of the sensor electrodes 202 and/or transmitter electrodes 214B regardless of their respective transmitting or receiving function during a transcapacitive sensing scheme.

In FIG. 2B, an example sensor electrode implementation is illustrated having sensor electrodes 202 arranged in a "bars and strips" pattern. The pattern of sensor electrodes 202 is shown with wide (i.e., close to space filling) transmitter electrodes 214-1 through 214-4 under separate narrower receiver electrodes 212-1 through 212-4. Other example transcapacitive devices may also overlap sensor electrodes in orthogonal or other patterns or have separate surrounding shielding electrodes, or other designs. Other sensing devices may form the sensor electrodes in any shape including "diamond" filling shapes to minimize overlap between layers while maintaining symmetry (i.e., the same shape for transmitter and receiver electrodes), or other shapes to optimize display operation (i.e., where the sensing electrode also provides a display function). In FIG. 2C, an example sensor electrode implementation is illustrated having sensor electrodes 202 arranged in an array (or "matrix") of fully connected sensing electrodes each individually attached to a sensor module 208 through interface 209 (e.g., receiver electrode multiplexor and/or mixer) and through routing traces 215 to determination module 220. Similarly, the sensor electrodes 202 of the absolute capacitive sensing device shown in FIG. 2C are in a pattern of simple rectangles, which may not represent the detailed structure or geometry of the distributed sensor electrodes, and do not show the interconnection electrodes, routing traces or vias required to connect to processing system 110. The exemplary pattern comprises an array of sensor electrodes $202_{X,Y}$ arranged in X columns and Y rows, wherein X and Y are positive integers. In one example, X and Y are positive integers greater than or equal to two. The pattern of sensor electrodes 202 may have other configurations, such as polar arrays, repeating patterns, non-repeating patterns, a single row or column, or other suitable implementation. Further, in various embodiments the number of sensor electrodes 202 may vary from row to row and/or column to column. The sensor electrodes 202 may function either as transmitter or receiver electrodes responsive to the processing system 110 operating in either an absolute capacitive sensing or transcapacitive sensing mode.

Returning to FIG. 2A, the sensor electrodes 202 can be formed on one or more layers of substrate 216. In some touch screen embodiments, all or a portion of the sensor electrodes 202 are display electrodes of a display panel used in updating a display, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, thin film transistor (TFT) glass, or any other transparent material), in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-Domain Vertical Alignment (MVA)), over an emissive layer (OLED), etc. The display electrodes can also be referred to as "cathode electrodes" or "common electrodes," since the display electrodes perform functions of display updating and capacitive sensing.

The receiver electrodes 212 form areas of localized capacitive couplings with the transmitter electrodes 214 referred to as transcapacitances. The transcapacitances form "capacitive pixels" of a "capacitive image" (the full capacitive image is also referred to as a "capacitive frame"). The transcapacitances between the receiver electrodes 212 and the transmitter electrode(s) 214 change with the proximity and motion of input object(s) in the sensing region 120. That is, the capacitive pixel values can change from one capacitive image to the next based on presence of input object(s). Similarly, absolute capacitive sensor electrodes may have localized couplings to the user input through a face sheet or display lens, and form an array of "capacitive pixels".

In an embodiment, the processing system 110 includes a sensor module 208 and a determination module 220. The sensor module 208 includes sensor circuitry 204 that operates the sensor electrodes 202 to receive resulting signals. The sensor module 208 is coupled to the sensor electrodes 202 and the transmitter electrode(s) 214B (if present) through an interface 209 and routing traces 215. The interface 209 can include various switches, multiplexers, mixers, and the like that couple the sensor circuitry 204 to the sensor electrodes 202 and the transmitter electrode(s) 214B, if present. The routing traces 215 may include various conductive layers, connections, jumpers, and vias, etc. The sensor circuitry 204 can include a plurality of receivers (RXs) 206 and one or more transmitters (TX(s)) 210. The transmitters 210 are configured to couple modulated signal(s) to the transmitter electrodes 214 through the interface 209. The spatially separate transmitters 210 may each transmit a narrow band carrier, which modulates the signal voltages, and that carrier may in turn be convolved with an additional modulating waveform (e.g., a phase, frequency, or code modulation). The receivers 206 are configured to receive resulting signals from the receiver electrodes 212, and the demodulation circuitry 234 in turn demodulates and filters the resulting signals.

The determination module 220 is coupled to the sensor module 208. The determination module 220 is configured to determine capacitive measurements from the resulting signals received by the sensor circuitry 204. The determination module 220 can also determine position information for input object(s) from the capacitive measurements. In an embodiment, the determination module 220 includes processor circuitry 226, such as a digital signal processor (DSP), microprocessor, or the like. The determination module 220 can include memory 228 configured to store software and/or firmware (SW/FW 230) configured for execution by processor circuitry 226 to implement various functions. Alternatively, some or all of the functions of the determination module 220 can be implemented entirely in hardware, such as with the circuitry 232. The processing system 110 can include other modular configurations, and the functions performed by the sensor module 208 and the determination module 220 can, in general, be performed by one or more modules or circuits in the processing system 110. In an embodiment, the circuitry 232 includes demodulation circuitry 234. Similarly, some or all of the functions of the demodulation circuitry 234 can be implemented in firmware.

Figure 6:
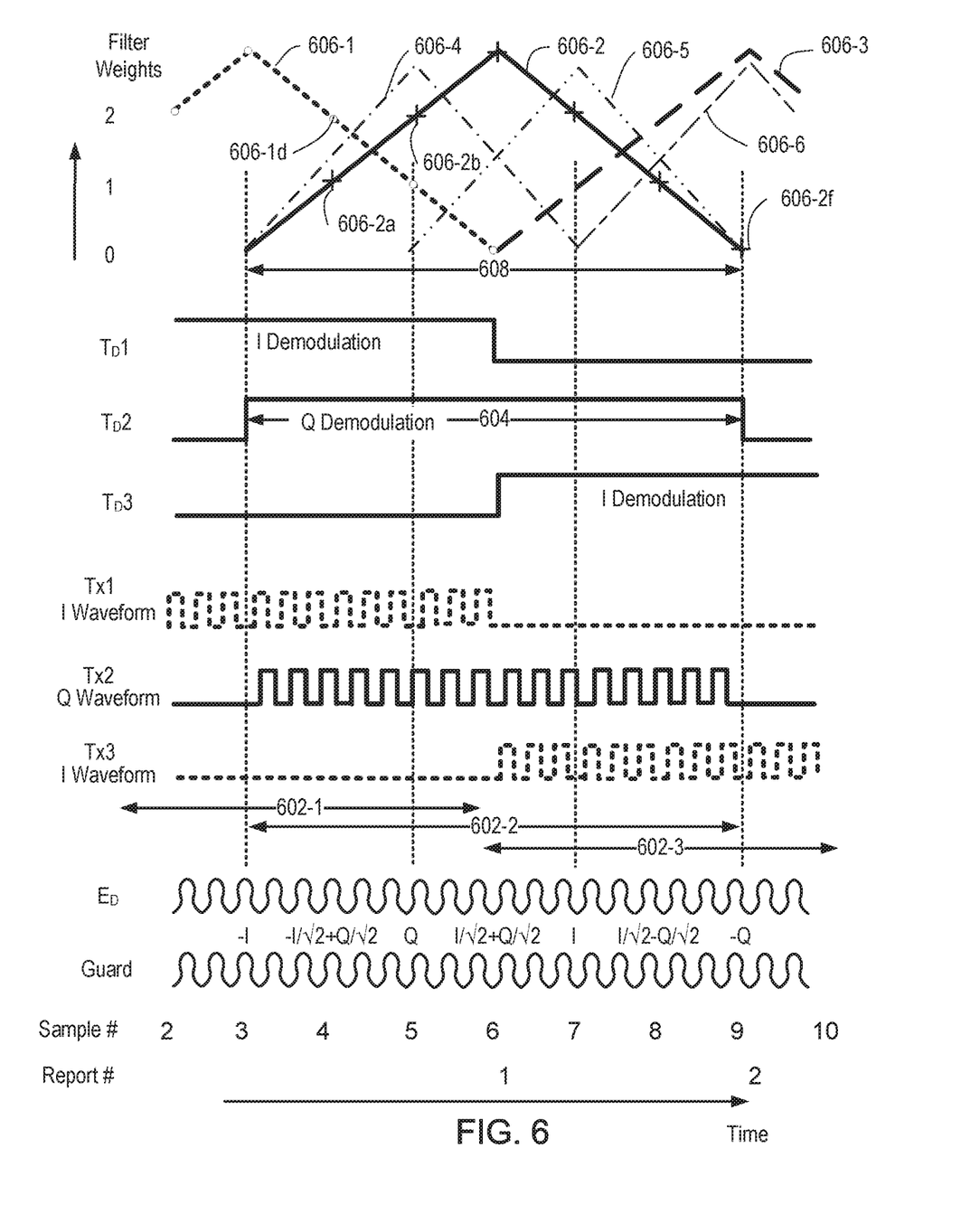
FIG. 6 is a graph that illustrates the relationship between the impulse responses of the digital filters, the transmitter periods, and the demodulation periods over time in the three channels shown in FIG. 5.

The demodulation circuitry 234 demodulates and filters the resulting signals received by the sensor circuitry 204 (i.e., from the modulated resulting signals). Signals (e.g., waveforms) may be transmitted simultaneously with multiple transmitters. Each n signal bursts (i.e., unique transmitter symbols or electrode/mux configurations which are converted by ADC) may give an independent sample with weights of the sequential result non-overlapping with non-zero weights of the prior result (e.g., filter weights 606-1$d$ and 606-2$b$ as illustrated in FIG. 6)). However, according to certain aspects, the measurements can be weighted differently (i.e., different filter weights applied to different measurements), even though each phase (e.g., I or Q) may still be weighted equally in the filter accumulated results for a particular report (e.g., type I or Q). For example, a triangle FIR filter may be used as shown in filters 606, although other (e.g., raised cosine, Hamming, etc.) filter weightings may also be used. Overlapping weightings refer to those that are non-zero (i.e., not before or after the effective beginning or end of the impulse response of the filter). Each filtered measurement result may be a narrow bandwidth measurement (i.e., low or band passed after demodulation and/or decoding) to allow analog-to-digital converter measurements at a rate less than 2 to 4 times the carrier frequency (i.e., limited by Nyquist). According to certain aspects, a series of demodulated signals may be accumulated into overlapping filters (e.g., 606-1 and 606-2), allowing for higher filter report rates up to the burst rate or measurement rate. Triangle weighted (e.g., higher order) filters have the advantage of reduced correlation between sequential reports of partially overlapping results. The demodulation circuitry 234 is discussed further below.

In an embodiment, the processing system 110 comprises a single integrated controller, such as an application specific integrated circuit (ASIC), having the sensor module 208, the determination module 220, and other module(s) and/or circuit(s). In another embodiment, the processing system 110 can include a plurality of integrated circuits, where the sensor module 208, the determination module 220, and other module(s) and/or circuit(s) can be divided among the integrated circuits. For example, the sensor module 208 can be on one integrated circuit, and the determination module 220 and other module(s) and/circuit(s) can be on one or more other integrated circuits. In some embodiments, a first portion of the sensor module 208 can be on one integrated circuit and a second portion of the sensor module 208 can be on a second integrated circuit. In such embodiments, at least one of the first and second integrated circuits comprises at least portions of other modules, such as a display driver module.

Figure 3A:
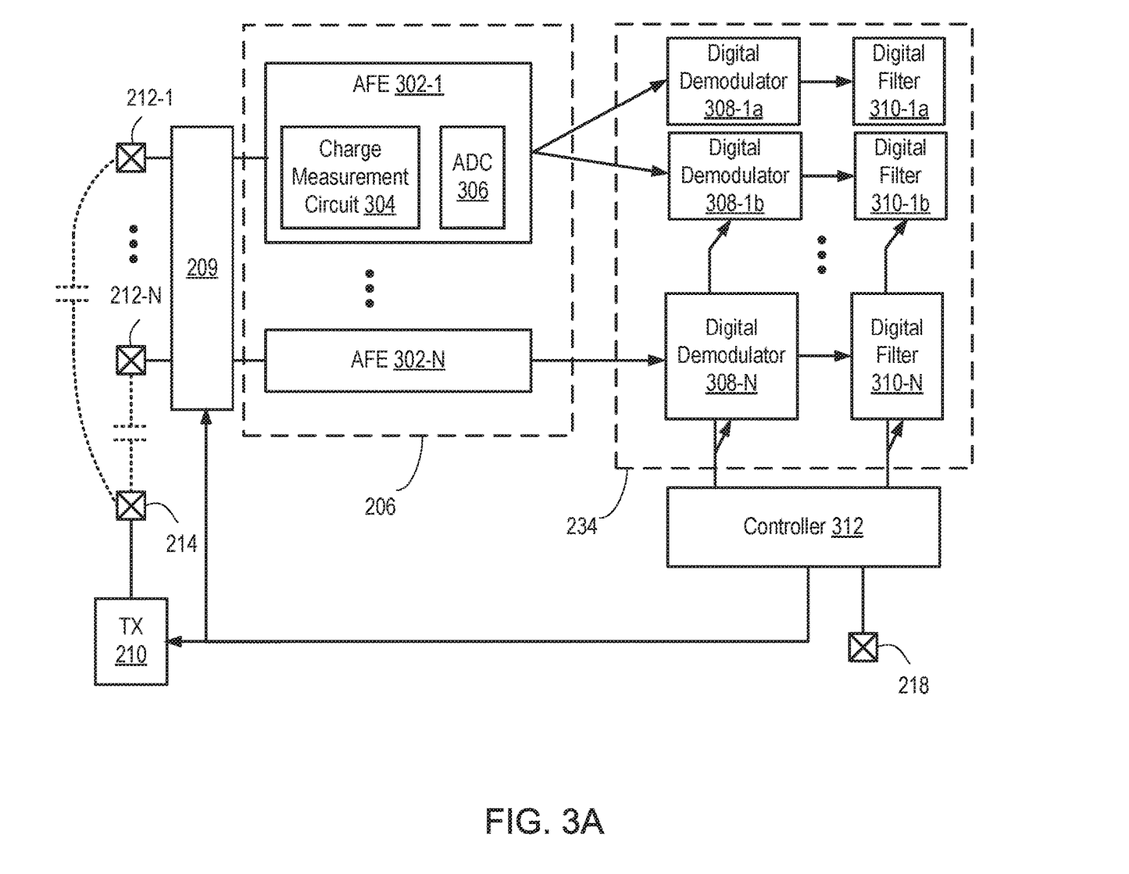
FIG. 3A is a block diagram depicting a portion of the processing system in detail, according to an embodiment.

FIG. 3A is a block diagram depicting a portion of the processing system 110 in detail according to an embodiment. In the embodiment, the receivers 206 include analog front-ends (AFEs) 302-1 through 302-N (collectively AFEs 302), where N is an integer greater than zero. The AFEs 302 include a charge measurement circuit 304 and an analog-to-digital converter (ADC) 306 (only AFE 302-1 is shown in detail for purposes of clarity). The charge measurement circuit 304 in each AFE 302 is electrically coupled to one or more receiver electrodes (e.g., a receiver electrode 212) through interface 209. A transmitter 210 is electrically coupled to a transmitter electrode 214. The transmitter electrode 214 is capacitively coupled to the receiver electrodes 212 as shown. The processing system 110 is connected to a reference voltage such as system ground 218 (e.g., through controller 312) and thus coupled to free space (e.g., earth ground) and any user input. Thus, any user input near the input sensing region 120 will affect the charge coupling from transmitter electrode(s) 214 to receiver electrodes(s) 212 due to relative modulation voltages and changing capacitances. The transmitter 210 couples a transmitter signal to the transmitter electrode 214, which is capacitively coupled to the receiver electrodes 212-1 through 212-N, respectively (collectively referred to as receiver electrodes 212). Although only a single transmitter 210 and transmitter electrode 214 are shown in the embodiment, the input device 100 can include multiple transmitters 210 and transmitter electrodes 214 controlled by controller 312. Controller 312 may also control the interface 209 connecting receiver electrodes 212 to AFEs 302 by multiplexing, mixing, guarding, grounding, or electrically isolating (i.e., floating) them as required. A single input is shown to each AFE 302, however multiple inputs (i.e., through multiple current conveyor circuits) may be present. In one embodiment, each AFE 302 may have a differential input (e.g., both positive and inverting input polarities) such that interface 209 may independently mix inputs from multiple receiver electrodes (e.g., receiver electrodes 212-1 and 212-2) into a single charge measurement circuit (e.g., AFE 302-1) with different phases or codes. In this way, multiple electrodes may be sensed by a single AFE 302 simultaneously, converted by a single ADC 306, and demodulated by multiple digital demodulators (e.g., demodulators 308-1*a* and 308-1*b*) into temporally overlapping digital filters 310-1*a* and 310-1*b* with different filter weights (e.g., filter weights provided by filters 606-5 and 606-6).

The charge measurement circuit 304 can be a charge integration circuit, contain a low input impedance current conveyer, or the like that is configured to measure a change in capacitive charge on the receiver electrode(s) 212 due to coupled modulation and/or interference. The charge measurement circuit 304 outputs an analog signal indicative of modulated coupled capacitive charge. The ADC 306 converts the analog signal output by the charge measurement circuit 304 into a digital signal. The ADC 306 outputs the digital signal corresponding to the analog resulting signal received by the receiver electrodes 212 for processing by the demodulation and filtering circuitry 234. As the digital signal corresponds to the analog resulting signal, the digital signal that corresponds to the resulting signal is also referred to as the resulting signal.

The demodulation circuitry 234 includes digital demodulators 308-1 through 308-N (collectively referred to as digital demodulators 308) and digital filters 310-1 through 310-N (collectively referred to as digital filters 310). Each digital demodulator 308 receives a resulting signal from a respective AFE 302. Once converted into a digital resulting signal (e.g., from ADC 306), multiple digital demodulators and filters may process the signals and accumulate them for filtering simultaneously. Each digital demodulator 308 is configured to combine a resulting signal with a selected demodulating signal to generate a demodulated signal. Each digital demodulator 308 can select a demodulating signal from a plurality of demodulating signals that are independent from each other in terms of frequency, phase, or code. That is, the demodulating signals have frequencies, phases, or codes that, when mixed with a resulting signal, generate independent output signals. For example, each digital demodulator 308 can combine a resulting signal with an in-phase (I) local oscillator (LO) signal or a quadrature (Q) LO signal to generate an I or Q demodulated signal. The I and Q LO signals are substantially orthogonal (i.e., ninety degrees out of phase). The digital filters 310 filter the demodulated signals, which are processed by the determination module 220 to determine changes in capacitance and position information. The digital filters 310 can be finite impulse response (FIR), infinite impulse response (IIR), or other suitable type of digital filters. Similarly, digital demodulators 308 may demodulate at substantially orthogonal frequencies (e.g., out-of-band after band pass filtering) to generate independent output signals (e.g., associated with a single receiver to transmitter couplings). In an embodiment, each digital demodulator 308 and digital filter 310 comprises a pair of digital demodulators and pair of filters, designated a and b (e.g., digital demodulator 308-1*a* and 308-1*b* and digital filter 310-1*a* and 310-1*b*) such that each "a" component performs in-phase processing and each "b" component performs quadrature processing.

The determination module 220 can include a controller 312 configured to control the transmitter(s) 210, the interface 209, and the digital demodulation circuitry 234. In particular, the controller 312 can control the electrode coupled waveforms generated by the transmitter(s) 210, receivers 206, and the coupling of the receivers through interface 209. The interface 209 may be a part of the same integrated controller ASIC, may be part of the display electronics (e.g., TFT), or other component. The controller 312 can control the digital demodulation and filtering performed by the demodulation circuitry 234. For example, the controller 312 can select a particular transmitted modulation waveform and demodulating signal and the demodulation period for each digital demodulator 308, such as transmitting Tx2 Q waveform over the $T_D2$ Q demodulation period 604. The controller 312 can be part of the circuitry 232 in the determination module 220, implemented by the SW/FW 230, or a combination thereof.

Demodulation and filtering may be implemented using a narrow pass bandwidth to reduce interference. Various code, frequency, and phase division multiplexing schemes may allow for narrower interference bandwidth by simultaneously transmitting independent signals on multiple transmitter electrodes and/or receiving independent signals on multiple receiver electrodes simultaneously. Although such a scheme allows for optimum signal-to-noise ratio (SNR), the power consumption of the transmitters can be significant and/or the complexity of the driver electronics can be increased. In embodiments described herein, instead of requiring temporally overlapping modulation (e.g., simultaneous transmission of independent transmitter signals), independent transmitted waveforms can be transmitted during the non-zero impulse response of respective digital filters 310 and peak at the peak of the impulse response. Thus, the transmitted amplitude of an independent waveform may be substantially matched to the filter impulse response for the corresponding independently demodulated signal. Alternately, the proportion of an independent signal (e.g., I or Q) may be controlled to peak the transmitted signal (i.e., maximize) when the impulse response of an associated demodulation filter is high (e.g., also near a peak) and similarly minimize the transmitted independent signal when the filter response is low while maintaining substantially constant transmitted voltage amplitude (e.g., a phase modulated or frequency shifted modulation). The signal coupled from a transmitter electrode to a receiver electrode through the associated multiplexor, mixer, demodulator, and filter may be maximized while maintaining the narrowest bandwidth (e.g., longest filter period). In this manner, the interference susceptibility bandwidth (or side bands) may be substantially reduced while the response to the transmitted signal is only marginally reduced (e.g., optimized). In addition, the technique can transmit a single transmitter waveform at a time, for example when guarding all active receivers, which reduces power consumption as compared to the code/frequency/phase division multiplexing schemes. Such embodiments are described in further detail below.

Figure 3B:
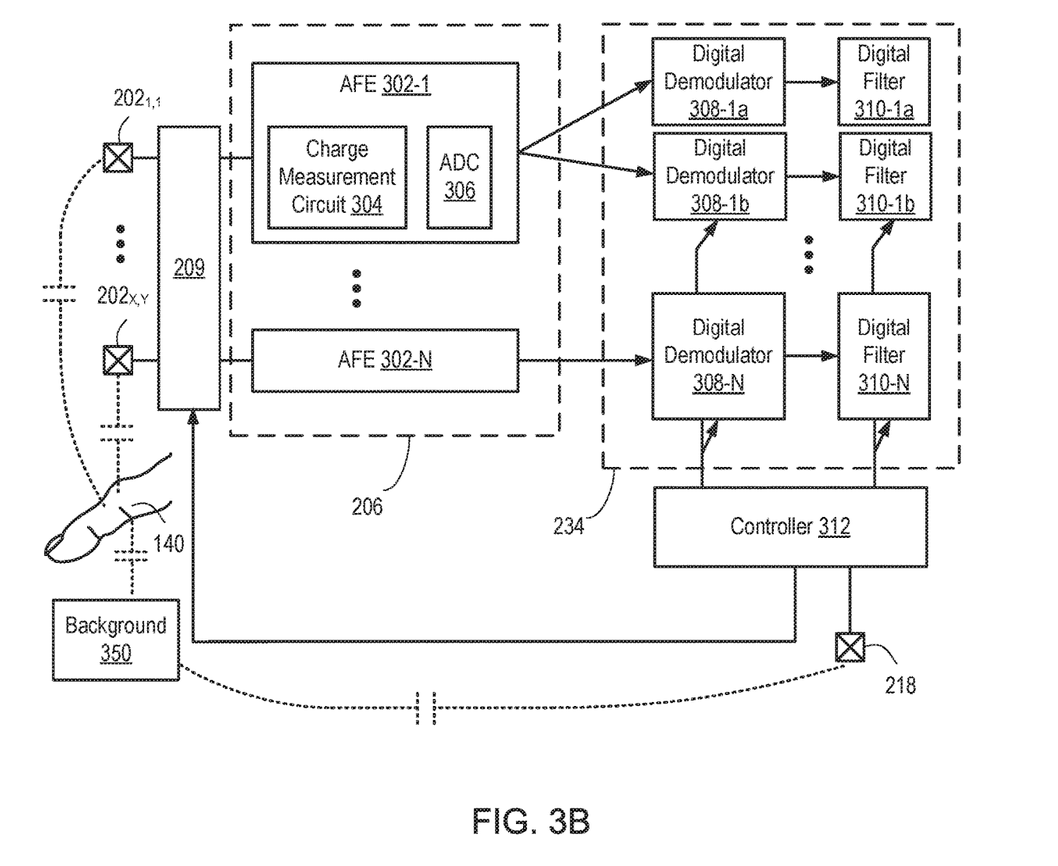
FIG. 3B is a block diagram depicting a portion of the processing system in detail, according to another embodiment.

FIG. 3B is a block diagram depicting a portion of the processing system 110 in detail according to another embodiment. Elements and operation of FIG. 3B that are the same or similar to those of FIG. 3A are described in detail above. In the present embodiment, the processing system 110 is configured for absolute capacitive sensing. In such an embodiment, each of the sensor electrodes $202_{1,1} \ldots 202_{X,Y}$ has an absolute capacitance with respect to a background potential 350 (e.g., earth ground) coupled to the processing system 110 (e.g., through system ground 218). Each AFE 302-1 . . . 302-N modulates a respective sensor electrode $202_{1,1} \ldots 202_{2,N/2}$ (i.e., relative to system ground 218). The AFEs 302 sense changes in self-capacitance of the sensor electrodes 202 and their relative modulation and charge coupling in the presence of input object(s) through those inputs coupling to a background capacitance (i.e., through system ground). The processing system 110 operates substantially as described above, except that the controller 312 controls the modulation (e.g., sensing or guarding) of the sensor electrodes 202 relative to a reference voltage (e.g., system ground), rather than transmitter(s) 210. The waveforms applied to the sensor electrodes 202 takes the place of the transmitter waveforms described above. Typically in self-guarding absolute capacitive (e.g., non-transcapacitive) systems, this restricts the modulated waveform to a single simultaneous modulation. In essence, the "transmitter waveforms" modulated relative to system ground discussed above are directly coupled onto the sensor electrodes 202 by the AFEs 302, rather than capacitively coupled through mutual transcapacitances and the direct coupling of user inputs through system ground is measured. The techniques described below can be used in either transcapacitive or absolute capacitive sensing embodiments.

Figure 4:
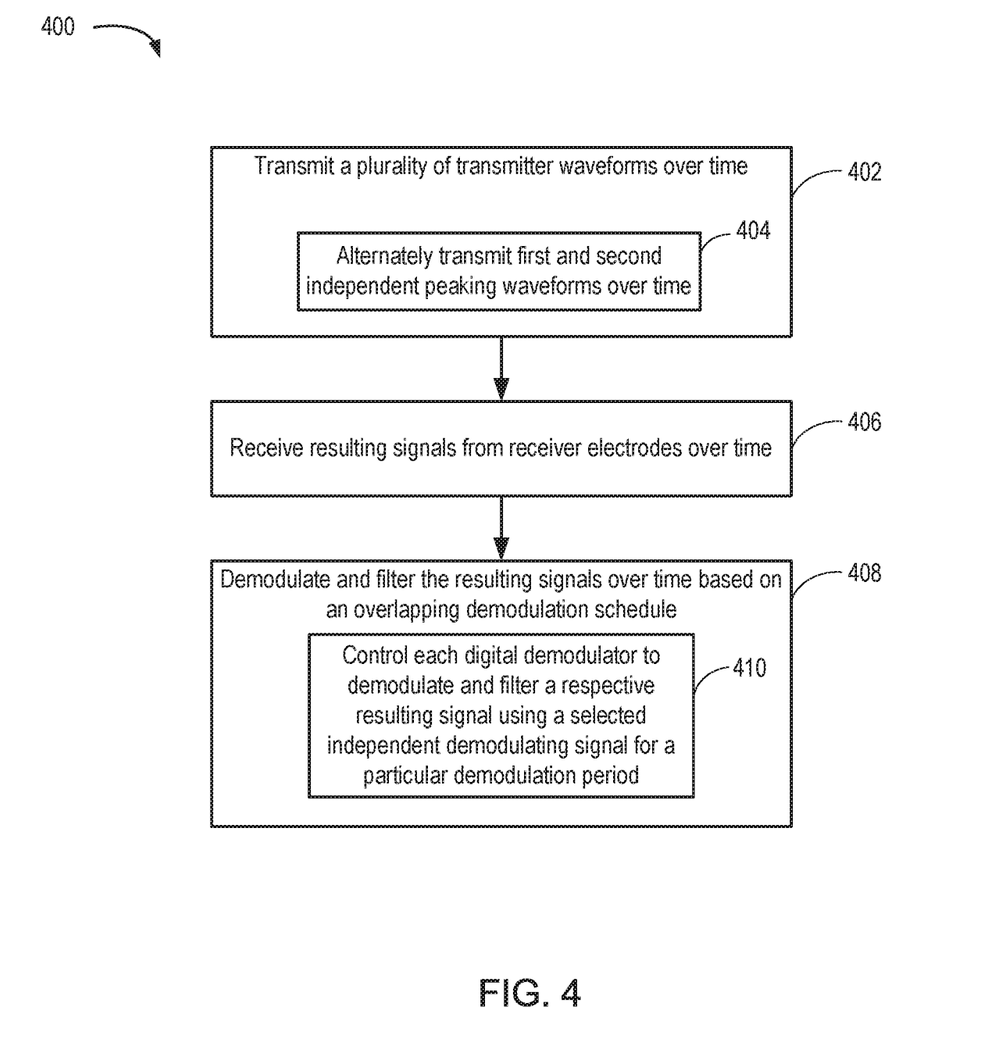
FIG. 4 is a flow diagram depicting a method of capacitive sensing, according to an embodiment.

FIG. 4 is a flow diagram depicting a method 400 of capacitive sensing according to an embodiment. Aspects of the method 400 can be understood with reference to the capacitive sensing device 200 shown in FIGS. 2-3. The method 400 begins at step 402, where the controller 312 controls the transmitter(s) 210 and receiver(s) 206 to modulate the sensor electrodes 202 relative to system ground and transmit a plurality of independent transmitter waveforms over time. Each transmitted waveform can be selected from a plurality of independent waveforms in terms of frequency, phase, or code. For example, the plurality of transmitter waveforms can alternate between an in-phase transmitter waveform and a quadrature transmitter waveform, where the in-phase and quadrature transmitter waveforms are substantially orthogonal in terms of phase. In another embodiment, an I component peaks in one waveform and a Q component peaks in the other where a fraction of each component is transmitted simultaneously while maintaining substantially constant amplitude (e.g., the ED waveform relative to a demodulation such as I or Q waveforms Tx1 or Tx2 in FIG. 6 or other phase modulated waveforms). In an embodiment, at least a portion of each transmitter waveform does not overlap any other transmitter using the same independent waveform over time (e.g., Tx1-3 waveforms in FIG. 6). For example, the transmitter waveforms can be transmitted in alternating I and Q sequence without overlap of either I or Q transmission. Alternately, the independent components may overlap, but peak and fall to optimize coupling to alternating filter impulse responses that peak and fall. In the case of an absolute capacitive system where the receivers include multiple receiver electrodes, the multiplexer (e.g., interface 209) may switch between receiver electrodes (e.g., disconnect a first and connect to a third while maintaining connection to a second) when the filter and corresponding transmitted component are minimized for that electrode filter (i.e., when the filter response is zero for the first and third receiver electrodes near sample 7 for filters 606-4 and 606-6).

In one embodiment, the capacitive sensing device 200 includes a plurality of electrodes 212 configured to alternately transmit two phase-independent peaking waveforms over time (e.g., I and Q waveforms) (step 404). In one example the I and Q waveforms may be boxcar modulated (i.e., each phase on while the other is off), thus the transmitter is either transmitting I or Q with a small non-overlap period. In another example the transmitter is modulated (e.g., at constant amplitude) with varying fractions of I and Q proportional to the filter weighting (e.g., the weighting of triangular filters 606). For example a periodic transmission signal S(t) may be described as a fully amplitude modulated I and Q components:

$$S(t)=\sin(\omega t+\varphi(t))=\sin(\omega t)\cos(\varphi(t))+\cos(\omega t)\sin(\varphi(t))=I\cos(\varphi(t))+Q\sin(\varphi(t)).$$

Note that for waveform $E_D$ and associated guard waveform, the polarity of the coupled I and Q components inverts on subsequent samples (e.g., sample 3 vs. sample 7), but this need not be the case as either the filter impulse response weighting (e.g., filter 606-4 vs. filter 606-6) may be inverted (e.g., negative from positive) or the demodulating waveform (e.g., similar to Tx3) may be inverted. A guard waveform is not sensed by a receiver (e.g., not including the case where the receiver electrodes 214 are at the same voltage and self-guarding) because the sensor electrode 202 on which the guard waveform is driven is modulated by substantially the same voltage as the receiver electrodes 214, and thus does not couple charge through the capacitance, and does not contribute to the received resulting signals. A waveform containing constant proportions of the independent waveforms, or constant proportion of each waveform does not have a peak of one independent waveform relative to the other. In other embodiments, the capacitive sensing device 200 can include multiple transmitter electrodes 212. In case of multiple transmitter electrodes 214, the transmitter waveforms partially overlap over time, but the same independent waveform cannot temporally overlap (i.e., more than one electrode may not transmit the same waveform simultaneously) on two transmitter electrodes 214 without creating unwanted dependence of both outputs on both couplings. Note that in FIG. 6, the Tx1 and Tx3 waveforms transmit the same I waveform, but do not overlap, while $T_D2$ overlaps with both Tx1 and Tx3, but the width 604 has an independent waveform and demodulation from $T_D1$ and $T_D3$ (e.g., Q not I). In the case of a single transmitter or absolute capacitive sensing with a single modulation electrode, which may be guarded and/or self guarding, the transmitted waveforms may be non-overlapping (alternating I and Q) or may contain components of both independent waveforms (e.g., I and Q) such that the modulation amplitude remains constant (i.e., constant total magnitude for the sum of I and Q components), where one component goes to a minimum while the other goes to a maximum, each corresponding to a filter weighting maximum and minimum for a particular connected receiver electrode.

At step 406, the receivers 206 receive resulting signals from the receiver electrodes 212 over time. The resulting signals indicate received capacitive charge on the receiver electrodes 212 in response to capacitive coupling of the modulated transmitted signal to the receiver electrodes 212 and the absence/presence/motion of input object(s) in the sensing region 120. In the embodiment shown in FIG. 3B, each AFE 302 generates a resulting signal from the received signals using the interface 209 through routing traces 215 from the receiver electrodes 212 to the charge measurement circuit 304 and the ADC 306 by modulating the electrodes 202 with transmitter waveforms.

At step 408, the controller 312 controls the demodulation circuitry 234 to demodulate and filter the resulting signals over time based on a demodulation schedule. In particular, the controller 312 controls each digital demodulator 308 to demodulate and filter a respective resulting signal using a selected independent demodulating signal for a particular demodulation period (step 410) where the demodulation and filtering periods of sequential filtered results overlap (e.g., filters 606-1 and 606-2 or 606-2 and 606-3). The method 400 can be further understood with reference to the examples shown in FIGS. 5 and 6.

Figure 5:
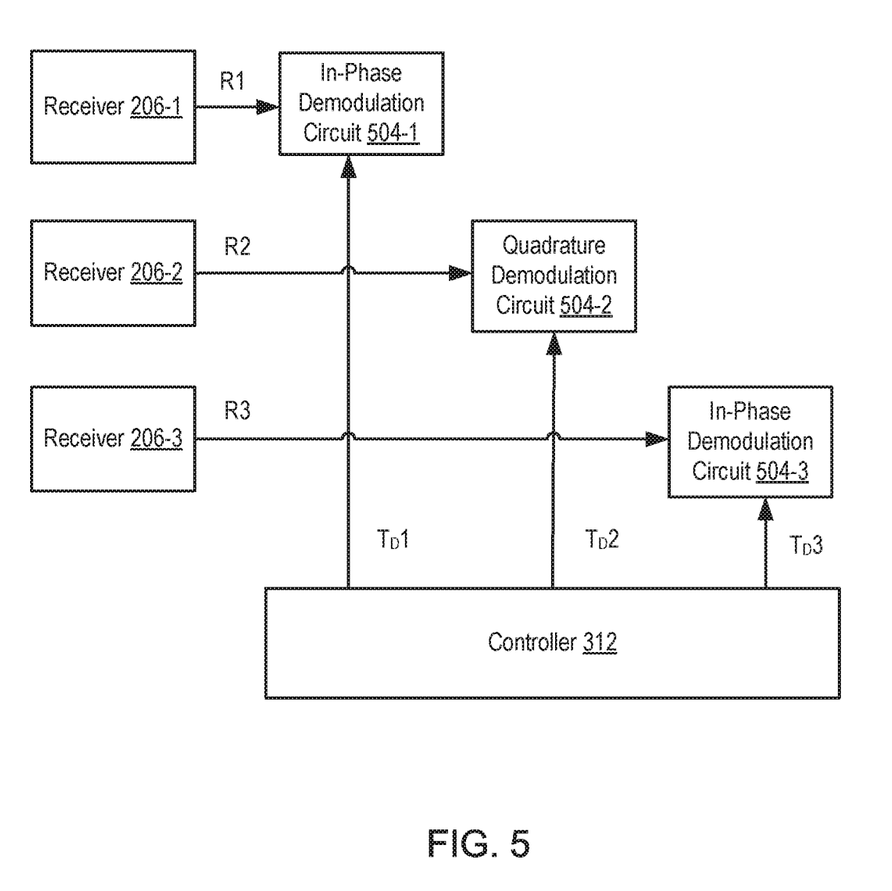
FIG. 5 is a block diagram depicting a logical configuration of three channels in a capacitive sensing device, according to an embodiment.

FIG. 5 is a block diagram depicting a logical configuration of three channels in the capacitive sensing device 200 according to an embodiment. FIG. 5 shows three receivers 206-1, 206-2, and 206-3 that generate resulting signals R1, R2, and R3, respectively. Each receiver 206 can include an AFE 302 as shown in FIG. 3. In an alternate embodiment, multiple demodulation circuits (e.g., demodulation circuits 504-1a and 504-1b like demodulators 308-1a and 308-1b) may provide quadrature and in-phase demodulation from the same receiver 206-1. The resulting signal R1 is processed by an in-phase demodulation circuit 504-1; the resulting signal R2 is processed by a quadrature demodulation circuit 504-2; and the resulting signal R3 is processed by an in-phase demodulation circuit 504-3. Each demodulation circuit 504-1, 504-2, and 504-3 can include a digital demodulator 308 and digital filter 310. The controller 312 configures the digital demodulator 308 of the in-phase demodulation circuits 504-1 and 504-3 to demodulate the respective resulting signals R1 and R3 using an in-phase demodulating signal. The controller 312 configures the digital demodulator 308 of the quadrature demodulation circuit 504-2 to demodulate the respective resulting signal R2 using a quadrature demodulating signal. Note that although the I and Q waveforms and the I and Q demodulation signals may be synchronous and phase locked, the I and Q waveforms and the I and Q demodulation signals may also be optimally delayed for any delays in the coupled signals caused the sensor or environment, such as RC delays. The optimization maximizes the signal from the intended transmitted waveform (e.g., Tx2 Q waveform) into one demodulated result (e.g., those for Q demodulation over width 604) while minimizing the signal from any other independent waveform simultaneously transmitting (e.g., Tx1 I waveform). The delay may be implemented directly by as a clock delay or indirectly by measuring the quadrature amplitude and phase of the signal to calculate a delay digitally (e.g., by using linear combinations of I and Q). The filters associated with each demodulation circuit 504 peak when the amplitude/proportion of the transmitted independent waveform (e.g., I or Q) peaks in the transmitted signal to the receivers 206 through the interface 209 controlled by controller 312.

The controller 312 activates the demodulation circuits 504-1, 504-2, and 504-3 during demodulation periods $T_D1$, $T_D2$, and $T_D3$, respectively. That is, the in-phase demodulation circuit 504-1 demodulates and filters the resulting signal R1 during the demodulation period $T_D1$. The quadrature demodulation circuit 504-2 demodulates and filters the resulting signal R2 during the demodulation period $T_D2$. The in-phase demodulation circuit 504-3 demodulates and filters the resulting signal R3 during the demodulation period $T_D3$. Further, the controller 312 configures the digital filters 310 of the demodulation circuits 504-1, 504-2, and 504-3 to have overlapping impulse responses, as described further below with respect to FIG. 6.

FIG. 6 is a graph that illustrates the relationship between the impulse responses of the digital filters, the transmitter periods, and the demodulation periods over time in the three channels shown in FIG. 5. FIG. 6 shows three different transmitter periods 602-1, 602-2, and 602-3 over time. Each transmitter period is a time interval during which a transmitter transmits a waveform. In the example, a transmitter electrode 214 transmits the I waveform during the transmitter period 602-1, the Q waveform during the transmitter period 602-2, and the I waveform during the transmitter period 602-3. In the example, the I and Q transmitter waveforms are square waves that are orthogonal with respect to one another in terms of phase. Also in the example, the transmitter periods of the same independent waveform (e.g., I or Q) of periods 602-1, 602-2, and 602-3 do not overlap one another (i.e., period 602-1 does not overlap period 602-3) even though there are overlapping independent transmitter waveforms by multiple transmitters 210. In the case of a single transmitter all waveforms could be made non-overlapping or a waveform such as ED may be used which contains components of both I and Q which alternatively peak in magnitude, but maintain constant total amplitude. Other types of periodic transmitter waveforms can be used (e.g., sinusoidal waveforms, slew rate limited waveforms, triangle waveforms, etc.). While phase-independent waveforms are shown, the transmitter waveforms transmitted in transmitter periods 602-1 and 602-3 can otherwise be independent from the transmitter waveform transmitted in transmitter period 602-2 in terms of frequency or code. In addition, it is not necessary that the transmitter periods 602, such as shown by the width 604 of the demodulation period Tx2, corresponding to their filter weightings be strictly non-overlapping. For example, the transmitter period 602-2 for Tx2 can overlap a portion of the transmitter period 602-1 for Tx1 and/or the transmitter period 602-3 for Tx3. Still, the peak of each Tx waveform corresponds to the peak in the associated filter response. However, at least a portion (if not all) of the Tx2 transmitter period 602-2 does not overlap the Tx1 transmitter period 602-1, and at least a portion (if not all) of the Tx2 transmitter period 602-2 does not overlap the Tx3 transmitter period 602-3 such that each transmitter is not always at a peak while the other is at a peak.

FIG. 6 also shows the three demodulation periods $T_D1$, $T_D2$, and $T_D3$. In the example, for each demodulation period, logic high indicates that demodulation and filtering are enabled and logic low indicates that demodulation and filtering are disabled. In the example, a width of each demodulation period spans six samples of the filter 606 (i.e., a width 604 of the demodulation period $T_D2$ spans the samples 4 through 9 with sample weights 606-2a through 606-2f and the full accumulated filter response of 608, which may provide Report 2). FIG. 6 also shows exemplary sequential impulse responses of filters 606-1, 606-2, and 606-3 of the digital filters 310 in each of the demodulation circuits 504-1, 504-2, and 504-3, respectively. In the present example, each digital filter 310 is a triangle FIR filter and each impulse response includes a filter period 608 that spans the associated transmitter and demodulation periods (i.e., the filter period 608 spans a demodulation period generating Report 2). For example, the filter 606-2 includes a filter period 608 that spans the Tx2 transmitter period 602-2 and period 608 of filter 606-2 (i.e., the demodulation period $T_D2$). Also note that the Tx2 waveform remains at a peak when the filter 606-2 is also sampled at a peak weighting, while Tx1 and Tx3 are not at a peak (in fact the Tx2 peak is centered when they are not transmitting). In an embodiment, the filter 606-2 is positioned with respect to the Q waveform transmitted in the transmitter period 602-2 such that the weight of the filter is greater during the peak of transmitter period 602-2 than in the transmitter periods 602-1 and 602-3. For example, a center of the filter 606-2 (a location having the highest weight) can be at or near the center of the transmitter period 602-2. The filters 606-1 and 606-3 are similarly positioned with respect to the I waveforms transmitted in the transmitter periods 602-1 and 602-3, respectively. Thus, in the present example, both the filter period 608 and the width of the demodulation period 604 are longer than the transmitter period. In general, the filter period 608 and the demodulation period 604 have the same or similar durations, which can be up to the length of the non-overlapping transmitter period of the same waveform in the case where two independent transmitter waveforms are be transmitted in alternating sequence. Typically, the controller may transition the receiver input by a multiplexor to start measuring the next touch sensor electrode 202 when one filter period ends (e.g., a report is generated for filter 606-1), while filter 606-2 continues filtering, so that filter 606-3 can start filtering for a touch sensor electrode report following that of filter 606-2, such as shown in Report 2.

Consider a case where the filter period 608 and the demodulation period 604 are each two times longer than the transmitter period. For a $2^{nd}$ order triangle FIR filter, out-of-band signals may be reduced by approximately four times, while the in-band signal may be reduced by approximately 25%, as opposed to demodulating and filtering for only one transmitter period. As a result, the signal-to-interference ratio (SIR) may be approximately three times better and the SNR will be approximately 1.5 times better compared to demodulating and filtering for only one transmitter period.

While the example of FIGS. 5-6 show three channels, it is to be understood that the technique can be employed with any number of channels. While a $2^{nd}$ order triangle FIR filter is described in the examples, other types of digital filters can be employed. For example, a convolution of a signal and filter that provide a raised-cosine impulse response can be used that is even longer and narrower than a triangle FIR filter and exhibits little or no inter-symbol interference (ISI) (i.e., a root raised signal and a root raised impulse response filter convolve to provide a raised-cosine response). Various other filter orders or windows can be used, such as $3^{rd}$ or $4^{th}$ order, Gaussian, root raised cosine, Blackman, Hanning, Hamming, Kaiser, and the like, or hybrid windows, such as Plank-Bessel, and the like.

In the examples above, two independent transmitter waveforms are used. In other embodiments, more than two independent transmitter waveforms can be used. In such case, the filter and demodulation periods can be extended further. For example, if three independent transmitter waveforms are used on a single transmitter (i.e., only one independent waveform transmitted at a time), then the filter and demodulation periods can span up to five transmitter periods while remaining orthogonal to other measurements, although typically for evenly spaced reports, it would span no more than three periods so that previous and subsequent filtering demodulation and reporting periods may be of similar duration. More generally for N independent (e.g., orthogonal) modulations, the overlapping filtering and demodulation periods may extend up to 2N-1 transmitter periods without overlapping with a subsequent interfering modulation period or up to N transmitter periods while maintaining constant filtering and demodulation periods.

The embodiments and examples set forth herein were presented to explain the embodiments in accordance with the present technology and its particular application and to enable those skilled in the art to make and use the described technology. However, those skilled in the art will recognize that the foregoing description and examples have been presented for the purposes of illustration and example only. The description as set forth is not intended to be exhaustive or to limit the described technology to the precise form disclosed.

In view of the foregoing, the scope of the present disclosure is determined by the claims that follow.

What is claimed is:

1. A method of capacitive sensing comprising:
transmitting a first waveform over a first transmitter period;
transmitting a second waveform over a second transmitter period, wherein the second waveform is independent of the first waveform, and wherein at least a portion of the second transmitter period does not overlap the first transmitter period;

receiving, from sensor electrodes, a first resulting signal in response to capacitive coupling of the first waveform and a second resulting signal in response to capacitive coupling of the second waveform; and filtering the second resulting signal using a first finite impulse response (FIR) filter having an impulse response that spans at least a portion of the first transmitter period and the second transmitter period to obtain independent capacitive measurements.

2. The method of claim 1, wherein no portion of the second transmitter period overlaps the first transmitter period.

3. The method of claim 2, wherein the first and second waveforms are transmitted in sequence using a single transmitter.

4. The method of claim 1, wherein the first waveform is transmitted using a first transmitter and the second waveform is transmitted using a second transmitter.

5. The method of claim 1, wherein the first waveform comprises an in-phase waveform and the second waveform comprises a quadrature waveform having a phase that is substantially orthogonal to a phase of the in-phase waveform.

6. The method of claim 1, further comprising:
filtering the first resulting signal using a second FIR filter having an impulse response that spans the first transmitter period and at least a portion of the second transmitter period, to obtain another capacitive measurement.

7. The method of claim 1, further comprising:
transmitting a third waveform over a third transmitter period, wherein the second waveform is independent of the third waveform, and wherein at least another portion of the first transmitter period does not overlap the third transmitter period; and
receiving, from an additional sensor electrode, a third resulting signal in response to capacitive coupling of the third waveform, wherein the impulse response of the first FIR filter spans the at least a portion of the first transmitter period, the second transmitter period, and at least a portion of the third transmitter period.

8. The method of claim 1, wherein the first FIR filter comprises a triangle FIR filter.

9. The method of claim 8, wherein a weight of the first FIR filter is greatest during the portion of the second transmitter period that does not overlap the first transmitter period.

10. An input device comprising:
a plurality of sensor electrodes; and
a processing system coupled to the plurality of sensor electrodes, the processing system comprising:
at least one transmitter configured to transmit a first waveform over a first transmitter period and a second waveform over a second transmitter period, wherein the second waveform is independent of the first waveform, and wherein at least a portion of the second transmitter period does not overlap the first transmitter period;
a first receiver configured to receive a first resulting signal from a first sensor electrode of the plurality of sensor electrodes in response to capacitive coupling of the first waveform to the first sensor electrode;
a second receiver configured to receive a second resulting signal from a second sensor electrode of the plurality of sensor electrodes in response to a capacitive coupling of the second waveform to the second sensor electrode; and
a first finite impulse response (FIR) filter configured to filter the second resulting signal, wherein an impulse response of the first FIR filter spans at least a portion of the first transmitter period and the second transmitter period, to obtain independent capacitive measurements.

11. The input device of claim 10, wherein no portion of the second transmitter period overlaps the first transmitter period.

12. The input device of claim 11, wherein the at least one transmitter comprises a single transmitter that transmits the first and second waveforms in sequence.

13. The input device of claim 10, further comprising a second FIR filter configured to filter the first resulting signal, wherein an impulse response of the second FIR filter spans the first transmitter period and at least a portion of the second transmitter period, to obtain another capacitive measurement.

14. The input device of claim 10, wherein the first FIR filter comprises a triangle FIR filter.

15. The input device of claim 14, wherein a weight of the first FIR filter is greatest during the portion of the second transmitter period that does not overlap the first transmitter period.

16. A processing system for a capacitive sensing device, comprising:
at least one transmitter configured to transmit a first waveform over a first transmitter period and a second waveform over a second transmitter period, wherein the second waveform is independent of the first waveform, and wherein at least a portion of the second transmitter period does not overlap the first transmitter period;
a first receiver configured to receive a first resulting signal from a first sensor electrode in response to capacitive coupling of the first waveform to the first sensor electrode;
a second receiver configured to receive a second resulting signal from a second sensor electrode in response to a capacitive coupling of the second waveform to the second sensor electrode; and
a finite impulse response (FIR) filter configured to filter the second resulting signal, wherein an impulse response of the FIR filter spans at least a portion of the first transmitter period and the second transmitter period, to obtain independent capacitive measurements.

17. The processing system of claim 16, wherein no portion of the second transmitter period overlaps the first transmitter period.

18. The processing system of claim 17, wherein the at least one transmitter comprises a single transmitter that transmits the first and second waveforms in sequence.

19. The processing system of claim 16, wherein the FIR filter comprises a triangle FIR filter.

20. The processing system of claim 19, wherein a weight of the FIR filter is greatest during the portion of the second transmitter period that does not overlap the first transmitter period.

* * * * *